United States Patent
Kubo et al.

[11] Patent Number: 6,044,800
[45] Date of Patent: Apr. 4, 2000

[54] DENTAL CARE ARTICLE FOR PETS AND PROCESS FOR PRODUCING THE SAME

[75] Inventors: Michiyo Kubo; Yoshihiko Nakano; Shigemasa Aoki; Masaharu Kamei, all of Tokushima, Japan

[73] Assignee: Earth Chemical Co., Ltd., Tokyo, Japan

[21] Appl. No.: 09/091,279

[22] PCT Filed: Jul. 29, 1997

[86] PCT No.: PCT/JP97/02630

§ 371 Date: Jun. 16, 1998

§ 102(e) Date: Jun. 16, 1998

[87] PCT Pub. No.: WO98/17104

PCT Pub. Date: Apr. 30, 1998

[30] Foreign Application Priority Data

Oct. 17, 1996  [JP]  Japan .................................. 8-274897

[51] Int. Cl.$^7$ .................................................. A01K 29/00
[52] U.S. Cl. ........................... 119/710; 119/709; 119/711
[58] Field of Search ................................... 119/702, 707, 119/709, 710, 711

[56] References Cited

U.S. PATENT DOCUMENTS

| | | | |
|---|---|---|---|
| 3,476,086 | 11/1969 | Way | 119/710 |
| 4,364,925 | 12/1982 | Fisher | 424/50 |
| 5,186,124 | 2/1993 | Woodford | 119/29 |
| 5,215,038 | 6/1993 | O'Rourke | 119/710 |
| 5,329,881 | 7/1994 | O'Rourke | 119/710 |
| 5,367,986 | 11/1994 | O'Rourke | 119/709 |
| 5,392,734 | 2/1995 | Laone et al. | 119/710 |
| 5,467,741 | 11/1995 | O'Rourke | 119/710 |
| 5,476,069 | 12/1995 | Axelrod | 119/709 |
| 5,477,815 | 12/1995 | O'Rourke | 119/710 |
| 5,485,809 | 1/1996 | Carroll | 119/710 |
| 5,560,320 | 10/1996 | Plunk | 119/709 |
| 5,711,254 | 1/1998 | O'Rourke | 119/710 |

FOREIGN PATENT DOCUMENTS

| | | | |
|---|---|---|---|
| 676468 | 12/1963 | Canada | 119/709 |
| 220785 | 5/1987 | European Pat. Off. | 119/709 |
| 2115837 | 10/1972 | Germany | 119/710 |
| 2402346 | 7/1975 | Germany | 119/709 |
| 49-30172 | 3/1974 | Japan . | |
| 61-293324 | 12/1986 | Japan | A01K 13/00 |
| 2-120155 | 9/1990 | Japan | A01K 29/00 |
| 40/3022935 | 1/1991 | Japan | 119/707 |
| 5-76293 | 3/1993 | Japan | A23K 1/18 |

OTHER PUBLICATIONS

Supplemental Advertisement, Washington Post, Dec. 1995.

*Primary Examiner*—Michael J. Carone
*Assistant Examiner*—Fredrick T. French, III
*Attorney, Agent, or Firm*—Sughrue, Mion, Zinn, Macpeak & Seas, PLLC

[57] ABSTRACT

There is provided an edible dental care article, that is so palatable to the taste of pets, clears residual food in the pet's mouth while chewed by a pet, thereby not only preventing adhesion of plaque and formation of dental calculus but giving a massage to the pet's gum. The edible dental care article for pets is characterized in that a casing material is processed in a thread-like manner, a string-like manner, or a thin-tube-like manner; one of the casing material or a combination of the casing material of several kinds, preferably combined with thread-like other proteins, carbohydrates or lipids, is twisted in a string-like manner; cord-like members are tied into a bundle or twisted together so as to make a rope-like member of a prescribed shape in conformity with the kind or size of a pet, with the twists of the rope-like member being treated so as not to loosen.

13 Claims, 3 Drawing Sheets

DENTAL CARE ARTICLE FOR PETS AND PROCESS FOR PRODUCING THE SAME

TECHNICAL FIELD

This invention relates to a dental care article for pets and a process for producing the same. More particularly, it relates to an edible dental care article that is so palatable to the taste of pets that a pet would like to chew it, and while chewed, it clears the mouth of residual food; and to a process for producing the same.

BACKGROUND ART

Available dental care articles for pets, such as dogs, for teeth protection include toothbrushes, with which an owner cleans the pet's teeth to remove plaque or tartar, and bone-like chewable articles which, while chewed, clean the teeth making use of the dogs' habit of toying. However, brushing dog's teeth troubles the owner, and it does not work if a dog hates its teeth being brushed. The chewable toy articles are not very effective because a dog loses interest in the same article soon.

An object of the present invention is to settle the above-described problems and to provide a dental care article for pets which is very palatable to pets and is easy for a pet to hold in its mouth and chew but not easy to swallow, needing at least several tens of chews, nearly 100 chews or even more before it is capable of being swallowed. Such a dental care article will remove the food remaining on teeth while being chewed to prevent adhesion of plaque thereby to prevent formation of dental calculus (tartar). It will also give a thorough massage to the gum to prevent deterioration of the animal's teeth and to maintain the dental health of the animal.

Another object of the present invention is to provide a process for producing a dental care article for pets which accomplishes the above object and hardly allows microorganisms to proliferate.

DISCLOSURE OF THE INVENTION

As a result of extensive studies, the inventors of the present invention have succeeded in providing the following dental care articles for pets and a means for producing the same, which accomplish the above objects.

(1) A dental care article for pets comprising an artificial casing material processed in a thread-like manner, a string-like manner, or a thin-tube-like manner; and/or a thread-like natural casing material or a string-like natural casing material or a thin-tube-like natural casing material; one or a combination of the artificial casing material and the natural casing material being twisted into a rope-like member of a prescribed shape in conformity with the kind or size of a pet, with the twists of the rope-like member being treated so as not to loosen.

(2) A dental care article for pets comprising an artificial casing material processed in a thread-like manner, a string-like manner, or a thin-tube-like manner; and/or a thread-like natural casing material or a string-like natural casing material or a thin-tube-like natural casing material; one or a combination of the artificial casing material and the natural casing material being bundled and tied at both ends thereof and, if necessary, at regular intervals between the both ends into a bundle of a prescribed shape in conformity with the kind or size of a pet.

(3) The dental care article for pets according to (1) or (2), wherein a fist-like knot is provided on one or a combination of the thread-like artificial casing material or the string-like artificial casing material or the thin-tube-like artificial casing material and/or the thread-like natural casing material or the string-like natural casing material or the thin-tube-like natural casing material being twisted into a rope-like member or being bundled, so as to fix the rope-like member or the bundle.

(4) The dental care article for pets according to any one of (1) to (3), wherein a fist-like knot is provided on one or a combination of a processed material that is the artificial casing material processed in a thread-like manner, a string-like manner, or a thin-tube-like manner being combined with other proteins, carbohydrates or lipids processed in a thread-like manner, a string-like manner, or a thin-tube-like manner and/or a processed material that is the thread-like natural casing material or the string-like natural casing material or the thin-tube-like natural casing material being combined with other proteins, carbohydrates or lipids processed in a thread-like manner, a string-like manner, or a thin-tube-like manner being twisted into a rope-like member or being bundled, so as to fix the rope-like member or the bundle.

(5) The dental care article for pets according to any one of (1) to (4), wherein the rope-like member or the bundle including the fist-like knot and being constituted by one or a combination of the artificial casing material, a combination of the artificial casing material and the processed material, the natural casing material, and/or a combination of the natural casing material and a processed material is flavored with a seasoning extract to improve palatability.

(6) A process for producing a dental care article for pets comprising the steps of: processing an artificial casing material in a thread-like manner, a string-like manner, or a thin-tube-like manner and/or a natural casing material in a thread-like manner, a string-like manner, or a thin-tube-like manner; twisting one or a combination of the thread-like artificial casing material or the string-like artificial casing material or the thin-tube-like artificial casing material and/or the thread-like natural casing material or the string-like natural casing material or the thin-tube-like natural casing material into a rope-like member; treating the twists of the rope-like member so as not to loosen, then, heat-treating the rope-like member; and drying the rope-like member.

The dental care articles of the present invention can be shaped in conformity with the kind or size of various pets. For dogs, for example, the thickness of the rope-like member and the length between knots that are usually made at both ends of the rope-like member are designed for dogs to be held in their mouth and chew easily but not to swallow easily. The similar considerations should be given to the articles for cats.

The dental care articles of the present invention include those prepared by once twisting the thread-like artificial casing material, the string-like artificial casing material, the thin-tubes-like artificial casing material, the thread-like natural casing material, the string-like natural casing material, or the thin-tubes-like natural casing material together into a cord-like member, and then, twisting the cord-like members into a rope-like member or tying the cords into a bundle, fixing the rope-like member or bundle so as not to loosen, and cutting into a prescribed shape in agreement with the kind or size of pets.

The term "cord-like member" as used herein is intended to comprise a twisted string-like member, a plurality of string-like members twisted together, a twisted thin-tube-like member, a bundle of thread-like member or line-like member, and a twisted bundle of the thread-like member or line-like member.

The casing materials which can be used in the present invention include those used for ham and sausage products. The artificial or processed casing materials include those made of collagen, which are prepared by mechanically or chemically treating collagen into a paste and molding the paste in a thread-like manner, a string-like manner or a thin-tube-like manner, followed by drying. Therefore, the casing material can have not only a tubular form as is used for stuffing but any form that can be used in the form of a rope or a bundle. If desired, the collagen molecules can be crosslinked to enhance the strength and elasticity.

In using collagen as a raw material of the casing material, the collagen does not always need to be 100% pure and can contain other proteins, fiber or any other components.

Specific but non-limiting examples of the artificial or natural casing materials are shown below.

The natural casing materials include cattle's gut (skin), pig's gut (skin), sheep's gut (skin), chicken's gut (skin), and other edible animal's gut (skin).

(1) Animal Materials

Fats and oils, such as beef tallow, lard, mutton tallow, chicken's fat; flesh, skin and guts of fishes, such as sharks, sea bream, horse mackerel, sardines, and tilefish; flesh and shells of crustaceans, such as shrimps and crabs; flesh and shells of shellfishes, such as great scallops and short-necked clams; flesh, skin, guts, tendons, and whiskers of animals, such as cattle, pigs, horses, sheep, chickens, and whales; yolk, albumen, and shells of eggs of poultry, such as chickens and quails; and milk, such as cow's milk, sheep's milk and goat's milk.

These raw materials are mechanically or chemically processed to extract chitin, chitosan, collagen, gelatin, glue, casein, etc. in the form of a paste, molding the paste in a thin-tape-like manner or a thin-tube-like manner, and drying to obtain an artificial casing material. If desired, the constituent component can be crosslinked enzymatically (for example, with transglutaminase) or chemically to enhance the strength and elasticity.

The skin of cattle, pigs and horses can be slit in a thread-like manner for use as such. Where the paste formed in a thin-tape manner or a thin-tube manner has insufficient strength, it can be used in combination with other materials having sufficient mechanical strength.

(2) Vegetable Materials

Cereals, such as millet, oats, barley, wheat, rice, buckwheat, and corn; tubers and starch, such as sweet potatoes, konjak, taros, and potatoes; seed vegetables, such as soybeans, adzuki beans, and green peas; vegetables, such as gourd peelings, taro stalks, butterburr, and loofah, and their fiber; algae, such as kelp (kombu) and agar-agar; mushrooms, such as shiitake mushrooms and cultivated mushrooms.

These raw materials are mechanically or chemically treated into processed foods or extracts, such as spaghetti, macaroni, gluten, fên-tido (sticks of dried bean jelly), soya milk, dried bean curds, cellulose, etc. The extracts are made into a paste, which is molded in-a tube-like manner, followed by drying. Since the thus obtained cellulose is inferior in strength and taste, it is not used alone as an artificial casing material. Where the thin strings or tubes made from the paste have insufficient mechanical strength, they can be used in combination with other materials having sufficient strength.

While the above-described vegetable materials mainly comprise carbohydrates and proteins, any other edible plant materials acceptable to palate can be used.

The part of the dental care article that is to be chewed by a pet such as a dog has a rope-like shape made by directly twisting the thread-like casing material together or by once twisting the thread-like casing material together in a string-like manner and tying the twisted string-like casing material into a bundle or further twisting the twisted string-like casing material in a rope-like manner.

Artificial casing material which is preferably used in the present invention is the paste of collagen molded in a string-like manner or a tube-like manner as described above. It is preferable that the thin-string-like or thin-tube-like molded members are twisted together in a string-like manner, and such string-like members are tied up into a bundle or further twisted together in a rope-like manner. Pig's gut or sheep's gut, which is a natural casing material, can be used likewise. The artificial or natural casing materials may be slit in a thread-like manner. Further, the thread-like members may be twisted together in a string-like manner. Further, the string-like members may be tied into a bundle or further twisted together in a rope-like manner.

The skin of cattle, pigs or horses is slit in a thread-like manner, and the thread-like members are twisted together in a string-like manner. Further, the twisted string-like members are tied into a bundle or further twisted in a rope-like manner. The twists of the rope-like member should be treated so as not to loosen.

In order to fix the twists of the rope-like member so as not to loosen, both ends, and sometimes the middle, of the rope-like member are tied, braided or fixed with an edible thread or string. Other known means for fixing, such as a pair of hoof-shaped fasteners or clips made of an edible material, can be used.

Other various fixing means, such as an adhesive, heat sealing, and RF welding, can also be used. FIGS. 4 and 5 show heat-sealed joint 8 and RF welding joint 9, respectively.

The degree of twisting the rope-like portion of the dental care article of the present invention is desirably such that allows pet's teeth to bite into the inside thread-like members or string-like members making up the rope-like member deep enough for the gums to reach the surface of the rope-like member.

As a pet chews the dental care article of the present invention, food remaining in the mouth can be removed so that adhesion of plaque to the teeth -can be prevented. Generally available chewable articles for pets called dental gum which are made of hard cattle's skin, etc. are so solid that only the tips of teeth come into contact with the article while chewing. Therefore, they do not produce a massage effect nor a preventive effect on plaque adhesion. Besides, they do not please pet's palate.

In a preferred embodiment of the dental care article of the present invention, at least the rope-like portion of the dental care article is provided with a pet's favorite flavor to improve the palatability to the taste of pets.

The palatability of the dental care article of the present invention can be improved by a method comprising sufficiently providing at least part of the article with a seasoning extract having a taste or a flavor favored by pets, such as beef extract, pork extract, chicken extract or a mixture thereof, followed by drying, a method comprising filling the artificial or natural casing material with a pets' favorite flavor before twisting, or a method comprising intertwining a pets' favorite flavor with string-like members while twisted together in a rope-like manner, followed by drying.

The rope-like portion of the dental care article can be impregnated with an effective amount of a fluorine compound having a preventive effect on dental cavities. The fluorine compound will act on teeth together with saliva, which is effective in protecting tooth against decay. The dental care article can also be provided with a small amount (prophylactic amount) of a medicine for the oral cavity, or a preservative.

Where the dental care article is of the type that the rope-like member is knotted at both ends thereof for fixing, it is preferable that at least part of the rope-like member be provided with a seasoning extract or a favorite.

The casing material manufactured as described above is cut to a desired length. When the cut rope-like member or bundle contains water more than necessary, it is preferably subjected to a heat treatment and then dried. The heat treatment can be carried out either by heating with moist heat or by ordinary heating. Where the rope-like member or bundle has been provided with a seasoning extract or a favorite by impregnation with an extract, etc., the drying treatment is preferred for hygiene to prevent proliferation of microorganisms during storage.

Further, the heat treatment makes the rope-type dental care article into a better condition because the article shrinks on heating to become more thicker and more solid.

The dental care article of the present invention generally has the rope-like shape as in conventional dental care articles but can have various other shapes.

For example, it can have not only the shapes shown in FIGS. 1 and 2, but also a loop-like member 10 shown in FIG. 6 or a chain shape shown in FIG. 7. The loop-like member 10 obtained by, twisting cord-like members which are made by twisting pieces of an artificial casing material together, bringing both ends of the twisted cord-like member close to each other, and fixing the ends of the twisted cord-like member with a fastener. The chain shape shown in FIG. 7 which is composed of two loops linked in a chain-like manner.

Figure 1:
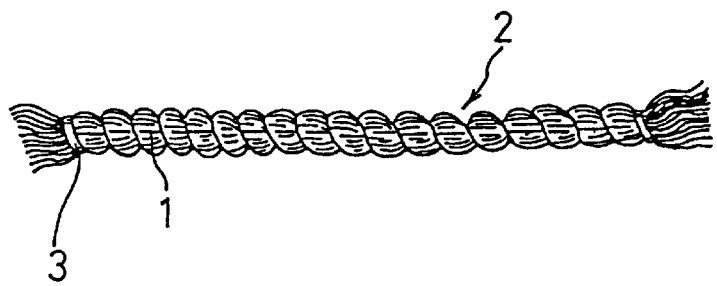
FIG. 1 shows a string-like member made by twisting pieces of an artificial casing material.

Reference numerals in the Figures have the following meanings.

1 . . . Artificial casing material
2 . . . Cord-like member
3 . . . Fastener
4 . . . Thread-like member
5 . . . Dental care article for pets
6 . . . Knot
7 . . . Bundle
8 . . . Heat-sealed joint
9 . . . RF welded joint
10 . . . Loop-like member

BEST EMBODIMENTS FOR CARRYING OUT THE INVENTION

The present invention will now be illustrated in greater detail with reference to Examples, but it should be understood that the present invention is not construed as being limited thereto.

EXAMPLE 1

Dental Care Article (1)

Figure 2:
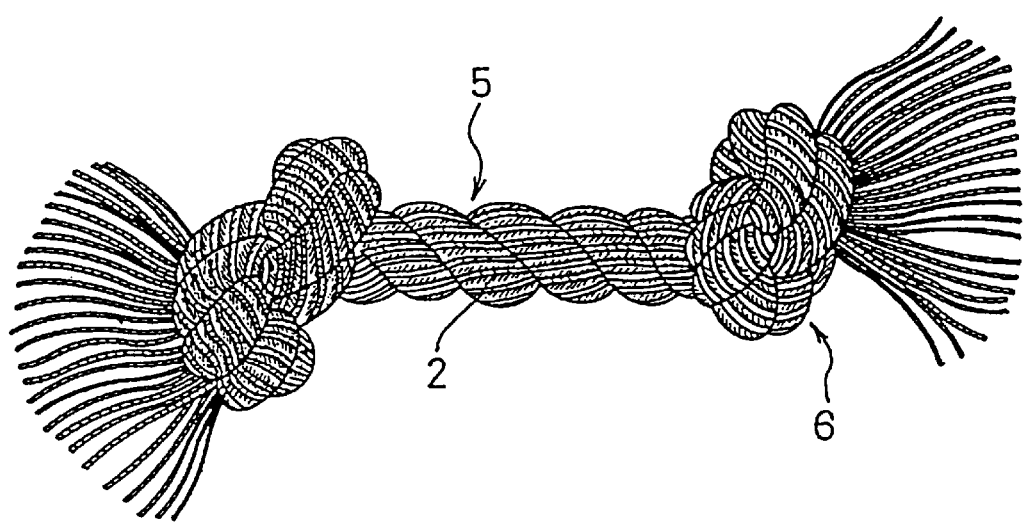
FIG. 2 shows a rope-like member made by twisting pieces of an artificial casing material together into a cord-like member and further twisting the twisted cord-like member, with its both ends knotted.
Figure 3:
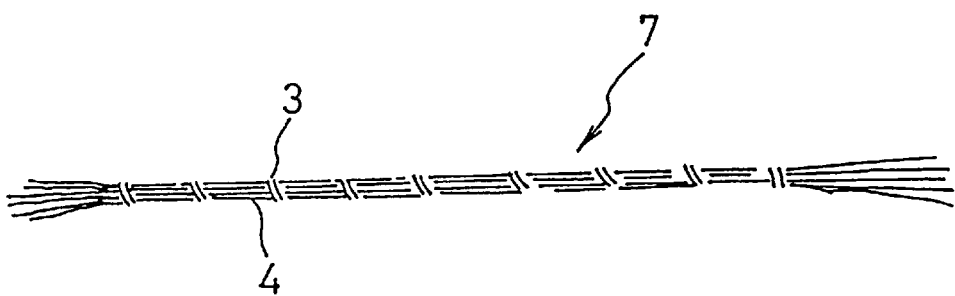
FIG. 3 shows a bundle of thread-like members obtained by finely slitting cattle hide, tied up at regular intervals.
Figure 4:
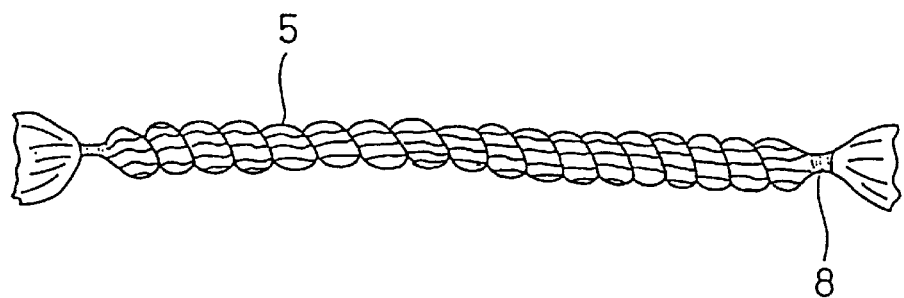
FIG. 4 shows a rope-like member obtained by twisting pieces of an artificial casing material together into a cord-like member and further twisting the cord-like member, with its both ends heat-sealed.

Collagen extracted from cattle bones was made into a paste. The paste was molded in a tube-like member to prepare an artificial casing material. The molded artificial casing materials 1 were twisted together, and both ends of the twisted artificial casing materials 1 were fixed with fastener 3 to obtain a cord-like member 2 shown in FIG. 1. A plurality of cord-like members 2 were twisted together in a rope-like manner to obtain dental care article 5 with knot 6 at each end thereof as shown in FIG. 2.

EXAMPLE 2

Dental Care Article (2)

Pieces of cattle's gut as a natural casing material were twisted together in a thin-plate-like manner. The thin-plate-like members were twisted together in a rope-like manner to obtain a dental care article knotted at each end thereof (dental care articles hereinafter described have the appearance of FIG. 1 unless otherwise noted).

EXAMPLE 3

Dental Care Article (3)

Thread-like members 4 obtained by slitting cattle's skin were tied up with fasteners 3 at regular intervals to obtain bundle 7. The bundle 7 was soaked in a seasoning extract having a flavor of beef and pork for 15 to 30 seconds and thoroughly dried. The impregnated and dried bundle was twisted together in a rope-like manner to obtain a dental care article for pets knotted at each end thereof.

EXAMPLE 4

Dental Care Article (4)

Collagen extracted from cattle's bones was made into a paste. The paste was molded in a tube-like manner to prepare an artificial casing material. Four tube-like members of the artificial casing material were twisted together to make a cord-like member. Three cord-like members were twisted together in a rope-like manner to obtain a dental care article for pets knotted at each end thereof.

EXAMPLE 5

Dental Care Article (5)

Collagen extracted from cattle's bones was made into a paste. The paste was molded in a tube-like manner to prepare an artificial casing material. The tube-like members were twisted together with fên-tido (sticks of dried bean jelly) to make a cord-like member. The cord-like members were further twisted together in a rope-like manner to obtain a dental care article for pets knotted at each end thereof.

EXAMPLE 6

Dental Care Article (6)

Loofah was treated and disentangled into a thread-like member, followed by drying. The thread-like members were twisted together in a string-like manner. The string-like member was soaked in a seasoning extract having a flavor of beef and pork for 15 to 30 seconds and thoroughly dried. The impregnated and dried string-like members were twisted together into a rope-like manner to obtain a dental care article for pets knotted at each end thereof.

The dental care articles for pets obtained in Examples 1 to 6 and commercially available dental care articles a (a bone-shaped rope-like member made of cotton threads with knot at each end thereof), b (a bone-like dried blend mainly comprising milk casein), and c (a bone-shaped molded article made from corn) were given to dogs, and the palatability, mouth cleaning properties and the like were evaluated in accordance with the following test methods. The results obtained are shown in Table 1 below.

TABLE 1

| | Palatability | Number of Times of Chewing | Mouth Cleaning Properties | Ease of Chewing | Total Judgment |
|---|---|---|---|---|---|
| Example 1 | A | 3 (150) | 4 | 2 | 9 |
| Example 2 | A | 3 (200) | 4 | 2 | 9 |
| Example 3 | A | 3 (270) | 4 | 2 | 9 |
| Example 4 | A | 3 (200) | 4 | 2 | 9 |
| Example 5 | A | 2 (90) | 3 | 2 | 7 |
| Example 6 | A | 3 (300 or more) | 4 | 2 | 9 |
| Compara. Example 1 | C–D | 0–1 (5–6) | 0 | 0 | 1 |
| Compara. Example 2 | C–D | 1–2 (20–60) | 0 | 0 | 1 |
| Compara. Example 3 | C | 1 (10) | 0 | 1 | 2 |

Test Method

After dogs were given an ordinary meal, their mouth was observed to confirm that there was residual food. Then, each of dental care articles (1) to (6) of Examples 1 to 6 and Comparative Example 1 (commercially available article (a)), Comparative Example 2 (commercially available article (b)) and Comparative Example 3 (commercially available article (c)) was given to each dog. The dog's manner of chewing the article was observed. After the test, the rate (%) of food removal (the rate of any residual food after the test to the residual food before chewing the article) was obtained.

Standard of Evaluation i) Palatability was rated as follows.

A . . . The dog chewed the article for preference.
B . . . The dog chewed in a usual manner.
C . . . The dog chewed occasionally.
D . . . The dog hardly chewed.

ii) The number of times of chewing was scored on a scale of 0 to 3 as follows.

| Score | Number of times of chewing |
|---|---|
| 0 | 0 |
| 1 | 1–49 |
| 2 | 50–99 |
| 3 | 100 or more | iii) Mouth cleaning properties were scored on a scale of 0 to 4 based on the rate of food removal.

| Score | Rate of food removal (%) |
|---|---|
| 0 | 0% |
| 1 | 1–24% |
| 2 | 25–49% |
| 3 | 50–74% |
| 4 | 75% or more | iv) Ease of chewing was scored as follows.

Score

0 . . . The dog often dropped the article or would not chew.
1 . . . The dog sometimes dropped the article.
2 . . . The dog continued holding the article in its mouth and chewed without dropping.

v) The scores of testing items (ii), (iii), and (iv) were added up to give the total judgment.

EXAMPLES 7 to 16

In order to examine differences in effects depending on the raw materials, the length of the dental care articles, the means for fixing both ends of the dental care articles, and the like, various dental care articles were prepared from the following raw materials for choice in accordance with the following steps which were carried out under different conditions for choice.

1) Raw Material (Collagen)

A: Pieces (width: 25 mm) of an artificial casing material having a crosslinked structure formed mainly of hydrogen bonds.

B: Pieces of an artificial casing material of non-crosslinked type.

2) Twisting

A: Two pieces were twisted together into a cord, and three cords were twisted together in a rope-like manner (i.e., a rope-like member).

B: Three pieces were twisted together into a cord, and three cords were twisted together in a rope-like manner (i.e., a rope-like member).

C: Six strings of collagen were twisted together.

3) Cutting

A: The rope-like member was cut to 45 cm lengths.
B: The rope-like member was cut to 25 cm lengths.

4) Fixing of both ends

A: The rope-like manner was tied up at 2.5 cm from each end with a thin-string of collagen.

Figure 5:
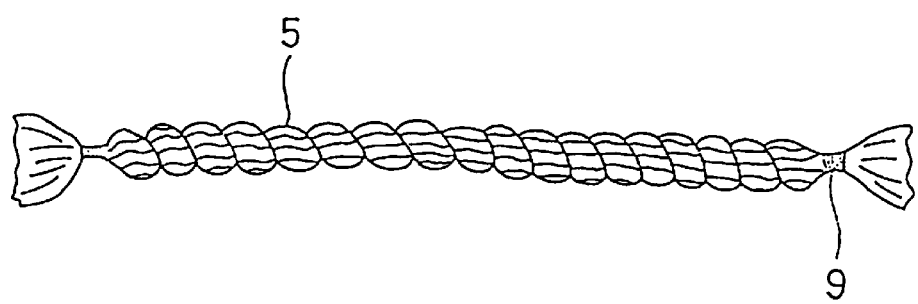
FIG. 5 shows a rope-like member by twisting pieces of an artificial casing material together into a cord-like member and further twisting the cord-like manner, with its both ends RF-welded.
Figure 6:
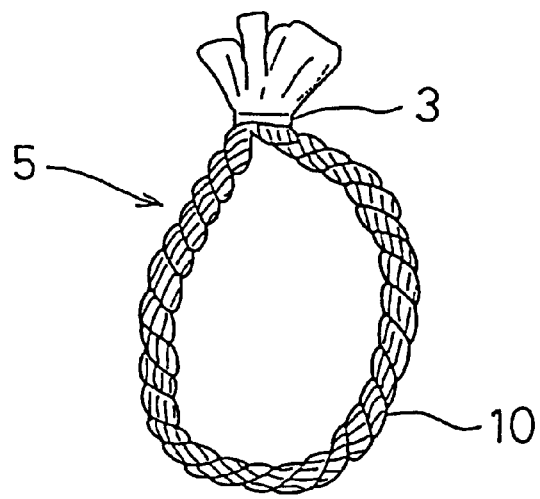
FIG. 6 shows a loop-like member obtained by, twisting cord-like members which are made by twisting pieces of an artificial casing material together, bringing both ends of the twisted cord-like member close to each other while forming the twisted cord-like member in a circular manner, and fixing the ends of the twisted cord-like member with a fastener.
Figure 7:
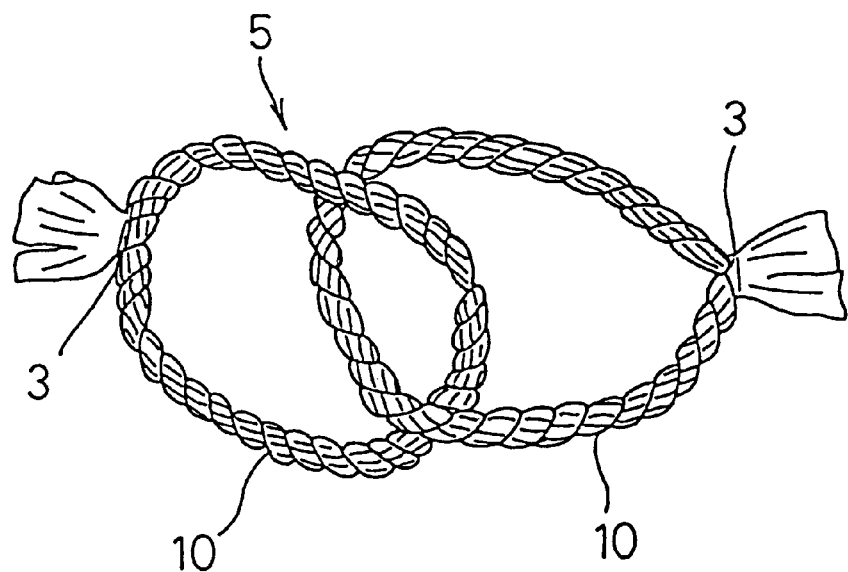
FIG. 7 shows two loop-like members of FIG. 6 linked in a chain-like manner.

B: Both ends of the rope-like manner were RF-welded to form joints 9 as shown in FIG. 5.

5) Steaming

At 80° C. (The temperature was raised from room temperature, and when the temperature reached 80° C., the heating was stopped, and the articles were taken out.)

6) Flavoring
   A: Seasoning liquid comprising 5% beef extract, 3% pork extract, and 0.08% preservative.
   B: No flavoring.
7) Drying
   At 90° C. for 90 minutes.

The raw material and the conditions in each step were combined as shown in Table 2 below to prepare 10 kinds of dental care articles for pets. The resulting articles were tested to evaluate the palatability, the number of times of chewing, the mouth cleaning properties, and ease of chewing in accordance with the same standards as adopted in Table 1. The results obtained are shown in Table 3 below.

Further, the water activity of every dental care article after the final drying step was found to range from 0.4 to 0.6. This is a difficult condition for microorganisms to grow, proving that these dental care articles have a long shelf life. Note that even those having a high water activity and having the possibility of microorganisms' growing could keep ling if packed in a retortable pouch and autoclaved (e.g., at 120° C. for 20 minutes).

TABLE 2

| Example No. | Raw Material | Twisting | Cutting | Fixing | Steaming | Flavoring | Drying |
|---|---|---|---|---|---|---|---|
| 7 | A | A | A | A | 80° C. | A | done |
| 8 | A | A | B | A | " | B | " |
| 9 | A | A | A | B | " | A | " |
| 10 | A | B | A | A | " | A | " |
| 11 | A | C | B | A | " | A | " |
| 12 | B | A | A | A | " | A | " |
| 13 | B | A | B | A | " | B | " |
| 14 | B | A | A | B | " | A | " |
| 15 | B | B | A | A | " | A | " |
| 16 | B | C | B | A | " | A | " |

TABLE 3

| Example No. | Palatability | Number of Times of Chewing | Mouth Cleaning Properties | Ease of Chewing | Total Judgment |
|---|---|---|---|---|---|
| 7 | A | 3 (280) | 4 | 2 | 9 |
| 8 | B | 3 (100) | 4 | 2 | 9 |
| 9 | A | 3 (160) | 4 | 2 | 9 |
| 10 | A | 3 (300) | 4 | 2 | 9 |
| 11 | A | 3 (120) | 4 | 2 | 9 |
| 12 | A | 3 (140) | 4 | 2 | 9 |
| 13 | B | 3 (150) | 4 | 2 | 9 |
| 14 | A | 3 (150) | 4 | 2 | 9 |
| 15 | A | 3 (200) | 4 | 2 | 9 |
| 16 | A | 3 (90) | 3 | 2 | 8 |

EXAMPLES 17 TO 20

An artificial casing material was prepared according to the formulation shown in Table 4 below, and dental care articles were made of the resulting material as follows.

Gelatin was melted by heat, and other materials such as calcium and zeolite were added thereto. The mixture was kept at about 50° C. for 1 hour to conduct enzymatic reaction. The reaction mixture was dried at 80° C. for 2 hours, and the resulting pasty material was molded in a string-like manner. The string-like members were twisted together and knotted at both ends to obtain rope-like dental care articles each having a length of about 15 cm and a diameter of about 8 mm.

EXAMPLES 21 TO 24

Four kinds of rope-like dental care articles having a length of about 15 cm and a diameter of about 8 mm were prepared in the same manner as in Examples 17 to 20.

TABLE 4

Formulation

| Component | Compounding Ratio (%) |
|---|---|
| gelatin | 20.0 |
| natural zeolite | 3.0 |
| bone calcium | 6.5 |
| lactosucrose syrup | 1.9 |
| beef extract | 1.0 |
| caramel | 1.0 |
| transglutaminase | 0.5 |
| disodium hydrogenphosphate | 0.5 |
| dipotassium hydrogenphosphate | 0.5 |
| thickener | 0.3 |
| preservative | 0.06 |
| water | 64.74 |

EXAMPLE 25

An artificial casing material was prepared according to the formulation shown in Table 5 below, and a dental care article was made of the resulting material as follows.

Gelatin was melted by heat and mixed with preheated coupling sugar. Powdered whole milk and a 50% citric acid aqueous solution were added thereto. The mixture was molded in a tape-like manner. The tape-like members were twisted together and knotted at both ends to obtain a rope-like dental care article having a length of about 15 cm and a diameter of about 8 mm.

TABLE 5

Formulation

| Component | Compounding Ratio (%) |
|---|---|
| coupling sugar | 67.0 |
| gelatin | 8.5 |
| powdered whole milk | 6.0 |
| 50% citric acid aqueous solution | 0.8 |
| water | 17.7 |

Test Method

The samples obtained in Examples 17 to 25 were tested on dogs to examine the number of times of chewing, the chewing time, and palatability. The evaluation on these testing items was made in accordance with the following rating or scoring standards, and the total judgement was made in the same manner as in Table 1. The test results obtained are shown in Table 6 below.

Standards of Evaluation i) Score Number of times of chewing

| i) | Score | Number of times of chewing |
|---|---|---|
|  | 0 | 0 |
|  | 1 | 1–49 |

-continued

| | 2 | 50–99 |
| --- | --- | --- |
| | 3 | 100 or more |
| ii) | Score | Chewing time |
| | 0 | 30 seconds or less |
| | 1 | 31–60 seconds |
| | 2 | 61–180 seconds |
| | 3 | 181 seconds or more | iii) Palatability was rated as follows.
A . . . The dog chewed the article for preference.
B . . . The dog chewed the article in a usual manner.
C . . . The dog chewed occasionally.
D . . . The dog hardly chewed.
iv) The scores of testing items (i) and (ii) were added up to give the total judgment.

TABLE 6

| | Number of | | | | Dog | | |
| --- | --- | --- | --- | --- | --- | --- | --- |
| Example No. | Times of Chewing* | Chewing Time** | Palata-bility | Total Judgment | Sex | Body Weight (kg) | Age |
| 17 | 3 (180) | 3 (200) | A | 6 | M | 12 | 5 |
| 18 | 3 (100) | 3 (200) | A | 6 | F | 10 | 8 |
| 19 | 2 (70) | 2 (150) | A | 4 | F | 8 | 12 |
| 20 | 2 (90) | 3 (200) | A | 5 | F | 11 | 7 |
| 21 | 3 (200) | 3 (240) | A | 6 | F | 10 | 2 |
| 22 | 2 (90) | 3 (190) | A | 5 | M | 11 | 2 |
| 23 | 3 (100) | 3 (190) | A | 6 | M | 9 | 2 |
| 24 | 3 (100) | 3 (300) | A | 6 | M | 12 | 2 |
| 25 | 2 (80) | 2 (120) | A | 4 | F | 10 | 3 |

Note:
*The values in the parentheses are the number of the times of chewing.
**The values in the parentheses are the chewing time (sec)

seasoning liquid and dried at 85° C. for 90 minutes to prepare a comparative sample.

2) Test Method

The sample of the present invention and the comparative sample were given to dogs at the same time to compare the palatability, the number of the times of chewing, hygiene, and safety.

3) Test Dogs

A: A 5-year-old male dog weighing 10 kg.
B: A 10-year-old female dog weighing 3 kg.

4) Test Results

The test results obtained are shown in Table 7 below.

TABLE 7

| Sample | Dog | Palata-bility | The Number of the Times of Chewing* | Ease of Chewing | Hygiene | Safety | Total Judgment |
| --- | --- | --- | --- | --- | --- | --- | --- |
| Compara-tive Sample | A | C–D | 1 (1) | 0 | poor | poor | 1 |
| | B | D | 0 (0) | 0 | poor | poor | 0 |
| Sample of Invention | A | A | 3 (130) | 2 | good | good | 5 |
| | B | A | 3 (150) | 2 | good | good | 5 |

Note:
*The values in the parentheses are the numbers of the time of chewing.

EXAMPLE 26

1) Preparation of Samples

Collagen was processed in a string-like manner. The string-like members were twisted together in a rope-like manner. After heat treating, the rope-like member was impregnated with a seasoning liquid containing 5% of beef extract and 3% of pork extract and dried at 85° C. for 90 minutes to prepare a sample according to the present invention. For comparison, a commercially available dental care article comprising cotton threads twisted together in a rope-like manner and knotted at both ends thereof (diameter: 17 mm; length: 150 mm) was impregnated with the same Standards of Evaluation
 i) Palatability
  A . . . The dog chewed the article for preference.
  B . . . The dog chewed the article in a usual manner.
  C . . . The dog chewed occasionally.
  D . . . The dog hardly chewed.
 ii) Hygiene
  good . . . There was only a small part of the article left uneaten (good hygiene).
  poor . . . The whole article was left uneaten (poor hygiene).

iii) Safety good . . . Made of an edible material, the article is safe for eating.

poor . . . If eaten, the article can cause such problems as impaired digestion.

5) Consideration

On comparing the sample of the present invention and the comparative sample, which were impregnated with the same seasoning liquid, the sample of the present invention was more pleasant to the dogs' palate. This seems to be because the ease of chewing and the palatability of the raw material itself contributes to the palatability of the article.

When the comparative sample was brought near the mouth of dog A, he took it between his teeth but did not chew. Dog B did not chew the comparative sample at all because of the improper size of the sample, which was the smallest of commercially available dental care articles, though.

The above testing thus proved the superiority of the sample according to the present invention in palatability, ease of chewing, hygiene, and safety.

INDUSTRIAL APPLICABILITY

The dental care articles for pets according to the present invention are produced by processing an artificial or natural casing material, inclusive of cattle hide, pig hide and the like, in a thread-like manner, a string-like manner, and twisting cord-like members made of these pieces together in a rope-like manner or tying the cord-like member into a bundle. The initial shape and size of the articles can be designed in order for pets to hold and chew easily but not to swallow easily. Therefore, a pet ought to chew the dental care article of the present invention several tens of times or even more. While a pet is chewing the article, the surface of the rope-like portion comes into contact with the gum of the pet so that residual food in the pet's mouth can be cleared. This is effective in not only preventing adhesion of plaque but also giving a massage to the gum, thereby making contribution to the dental health of pets.

Further, impregnation of the rope-like portion of the dental care article of the present invention with a fluorine compound can provide a chewable toy to be given to pets for the purpose of medical treatment because the fluorine compound will act on teeth together with saliva to protect tooth against decay. Made from edible components, the dental care article of the present invention is safe for eating. After taken, collagen used as a casing material is digested and absorbed to help bone formation and retardation of skin aging, making contribution to the health of pets from the aspect of alimentation. Collagen is also known effective in dieting.

We claim:

1. An edible dental care article, fit to be eaten as food, for cleaning the teeth and massaging the gums of pets during consumption of said edible dental care article comprising at least one of a processed casing material, made from an extract of at least one of a vegetable material and an animal material, and a natural casing material, comprising at least one of an animal gut and an animal skin, wherein said processed casing material is formed in one of a thread-like manner, a string-like manner, and a thin-tube-like manner, and wherein said natural casing material is selected from a group of natural casing materials formed in a thread-like manner, a string-like manner, and a thin-tube-like manner; wherein said at least one of the processed casing material and the natural casing material is twisted into a rope-like member of a prescribed shape and size, and wherein constituent parts of the twisted rope-like member are fixed by fastening means so as to retain a rope-like shape.

2. An edible dental care article, fit to be eaten as food, for cleaning the teeth and massaging the gums of pets during consumption of said edible dental care article comprising at least one of a processed casing material, made from an extract of at least one of a vegetable material and an animal material, and a natural casing material, comprising at least one of an animal gut and an animal skin, wherein said processed casing material is formed in one of a thread-like manner, a string-like manner, and a thin-tube-like manner, and wherein said natural casing material is selected from a group of natural casing materials formed in a thread-like manner, a string-like manner, and a thin-tube-like manner, wherein said at least one of the processed casing material and the natural casing material is adjacently disposed to one another to form a bundled shape member and said bundled shape member is tied at a plurality of points by a fastening means.

3. An edible dental care article for pets according to claim 1 or 2, wherein said fastening means is a knot.

4. An edible dental care article for pets according to claim 1 or 2, wherein said processed casing material is formed in combination with at least one of a protein, a carbohydrate and a lipid, and wherein said natural casing material is formed in combination with at least one of a protein, a carbohydrate and a lipid.

5. An edible dental care article for pets according to claim 4, wherein at least one of said natural casing material and said processed casing material is flavored with a seasoning extract.

6. An edible dental care article for pets as claimed in claim 2, wherein said bundled shape member is fastened by said fastening means at regular intervals along said bundled shape member.

7. An edible dental care article for pets as claimed in claim 7, wherein said fastening means is a knot in said rope-like member.

8. An edible dental care article for pets as claimed in claim 4, wherein said fastening means is a knot in said rope-like member.

9. A dental care article for pets as claimed in claim 2, wherein said bundled shape member is in the form of a cylinder.

10. An edible dental care article, fit to be eaten as food, for cleaning the teeth and massaging the gums of animals during consumption of said edible dental care article comprising at least one of a processed casing material made from an extract of at least one of a vegetable material and an animal material, and a natural casing material, comprising at least one of an animal gut and an animal skin, wherein said natural casing material is shaped in a plurality of string-like forms and said plurality of string like forms are twisted to form a rope-like member, and wherein each end of said rope-like member is fixed by fastening means.

11. An edible dental care article for animals as claimed in claim 10, wherein said fastening means is a knot in said rope-like member.

12. An edible dental care article for animals as claimed in claim 10, wherein said natural casing material is formed in combination with at least one of a protein, a carbohydrate and a lipid.

13. An edible dental care article for animals as claimed in claim 10, wherein said natural casing material is flavored with a seasoning extract.

* * * * *